United States Patent
Young et al.

[19]

[11] Patent Number: 5,854,531
[45] Date of Patent: Dec. 29, 1998

[54] STORAGE RING SYSTEM AND METHOD FOR HIGH-YIELD NUCLEAR PRODUCTION

[75] Inventors: Phillip E. Young, Temecula, Calif.; Delbert J. Larson, DeSoto, Tex.

[73] Assignee: Science Applications International Corporation, San Diego, Calif.

[21] Appl. No.: 865,851

[22] Filed: May 30, 1997

[51] Int. Cl.$^6$ .................................................. H05H 13/04
[52] U.S. Cl. ................................. 313/362.1; 313/359.1; 315/507; 315/503; 378/143; 250/398; 250/492.3; 376/194; 376/199
[58] Field of Search ...................... 313/362.1, 62, 313/359.1; 315/503, 507, 502, 504; 250/398, 492.3; 378/143, 141

[56] References Cited

U.S. PATENT DOCUMENTS

| | | | |
|---|---|---|---|
| 2,790,902 | 4/1957 | Wright ..................................... | 315/503 |
| 2,882,396 | 4/1959 | Courant et al. .......................... | 315/503 |
| 3,395,302 | 7/1968 | Brown, Jr. et al. ..................... | 315/507 |
| 5,001,438 | 3/1991 | Miyata et al. ........................... | 315/503 |
| 5,138,271 | 8/1992 | Ikegami .................................. | 315/502 |
| 5,631,526 | 5/1997 | Ferry ...................................... | 250/492.3 |
| 5,680,018 | 10/1997 | Yamada .................................. | 315/503 |

*Primary Examiner*—Sandra L. O'Shea
*Assistant Examiner*—Michael Day
*Attorney, Agent, or Firm*—Pretty, Schroeder & Poplawski

[57] ABSTRACT

A storage ring system and method for high-yield nuclear production of neutrons, isotopes and photons, include a particle supply for generating a beam of projectile or reaction particles, a closed storage ring for containing and recycling the projectile particles, an electron cooling system for stabilizing the projectile particles, and a target for initiating nuclear reactions with the projectile particles so as to generate the desired end-products, with improved efficiency and safety. The invention also provides a plurality of dipoles and/or trim magnets selectively situated around the ring to guide the projectile particles as they circulate within the system. Substantially trapped in the closed storage ring, the particle beam is recirculated inside the storage ring for repeated exposure to the target, until the particles either favorably react with the target or are lost through scattering. As new particles are injected into the storage ring, they merge with previously injected particles circulating the ring, thereby allowing a relatively high intensity beam to develop, even though the input current used to populate the system remains relatively low throughout the operation of the system. Advantageously, the present invention maintains the particle beam within optimal reaction parameters by providing the electron cooling system to stabilize the particle beam.

25 Claims, 2 Drawing Sheets

STORAGE RING SYSTEM AND METHOD FOR HIGH-YIELD NUCLEAR PRODUCTION

BACKGROUND OF THE INVENTION

The present invention relates to nuclear physics reactions, more particularly, to a method and system of generating photons, neutrons and a variety of nuclear isotopes, with improved efficiency and yield.

Neutrons, isotopes, or photons are used in numerous applications. Neutron applications include boron neutron capture therapy, neutron radiography, and particularly, neutron irradiation for explosive detection, contraband detection, corrosion detection, and other types of non-destructive analysis. Isotope applications include positron emission tomography (PET), which is gaining wider acceptance with recent changes in FDA regulations covering radioactive pharmaceuticals. Photon (or gamma ray) applications include photonuclear interrogation which has been proposed as another means of detecting contraband and explosives. Photonuclear interrogation is also used for medical imaging and other nondestructive analysis of a wide range of materials.

Conventional techniques for generating photons, neutrons and isotopes involve either nuclear reactors or particle accelerators, both of which have many drawbacks, including high energy requirements with low yield. Nuclear fission reactors, such as the TRIGA, are often used in the generation of large neutron fluxes. However, the reactors themselves, as well as support structures, typically require a large amount of space and extensive monitoring and maintenance. Moreover, isotope Cf-252 as a neutron source in nuclear fission reactors is difficult to use and economically unattractive under current radiation protection laws of most countries. Difficult to handle and a source of environmental concerns, nuclear reactor technology is generally not favored.

Linear accelerators have been used to generate neutrons. Compared to nuclear reactor technology, linear accelerators are smaller and more compact. However, linear accelerators capable of generating high beam currents used for the desired neutron flux can be electrically complicated and expensive. Furthermore, linear accelerators typically are operated in a pulsed manner, which generally requires beam stops that often become caustic and hazardous after use. In that regard, in a typical linear accelerator, a beam of particles such as deuterons is accelerated to high energy levels to impinge upon a target that is typically beryllium-based. Not only is most of the energy used to accelerate the deuterons wasted as excess heat, the spent beryllium target requires safe disposal. Additionally, practical limitations on the size of the linear accelerators result in neutron yields far lower than what is desired for many applications. These problems are not limited to neutron production, but are encountered in isotope production, which typically employs accelerated particles and reactive targets, as well, but through the use of cyclotrons.

The production of photons or gamma rays also employs accelerated particles and reactive targets, but through the use of interresonant accelerators, such as the RFQ and DTL. These types of accelerators often utilize complicated RF systems which can increase the cost of operation and maintenance. Gamma rays may also be generated by electrostatic machines; however, such machines are often very large, difficult to install and maintain, and require significant voltage, typically over one MV.

Accordingly, there is a need for an improved method and system for generating neutrons, isotopes and photons, which enables operation with improved efficiency and without excess complications or safety concerns. It is desired that such a method and system conserve energy, yet generate sufficient levels of fluxes so as to be useful in most applications. It is further desired that the method and system enable the recycling, reuse and/or storage of the accelerated particles and that the system be compact and relatively light weight.

SUMMARY OF THE INVENTION

The present invention, which addresses the above desires and provides various advantages, resides in a method and system for generating high fluxes of a variety of end-products, such as neutrons, isotopes and photons. The system with improved efficiency and safety, includes a particle supply for generating a beam of projectile or reaction particles, a storage ring for containing and recycling the projectile particles, an electron cooling system for stabilizing and restoring energy to the projectile particles, and a target for initiating nuclear reactions with the projectile particles to generate the desired end-products. In one embodiment, the particle supply includes an ion source and an accelerator injector (such as a cyclotron, a linear accelerator, or electrostatic accelerator) to supply the particle beam for bombarding the target. The system also includes a plurality of dipoles selectively situated around the ring to "bend" the direction of travel of the projectile particles within the system.

By providing a closed storage ring, the particle beam is contained within the system to repeatedly recirculate inside the storage ring. Particles failing to produce the desired end-products are enabled to circle the ring until they either favorably react with the target or are lost through scattering. And, as the particle supply continuously injects a low current of additional particles into the storage ring which merge with previously injected particles circulating in the ring, a relatively high intensity beam develops and is effectively stored in the system, even though the input current used to populate the system remains relatively low throughout the operation of the system. While a small fraction of particles is lost to reaction with the target, scattering and other events, the particle beam eventually increases in intensity and size as it circulates the ring, until equilibrium is reached between the additional current injected into the system and the current lost due to particle reactions or scattering.

Distinctly, the present invention effectively retains and conserves the energy introduced into the system by recycling and reusing the reaction particles. In particular, the bulk of the energy expended in the initial provision of the particle beam is not dissipated as excess heat, but retained in the particle beam as the projectile particles are enabled for repeated encounters with the target with each revolution.

Because the projectile particles are permitted to circulate in the system, instabilities could build up in the particle beam due to particle-target interaction or particle-particle interaction. Advantageously, the system maintains the particle beam within optimal reaction parameters by providing the electron cooling system to stabilize or "cool" the particle beam. Without the electron cooling system, the particle beam would "heat up" to undesirable levels, adversely affecting operation and utility of the system. Here, heating refers primarily to an increase in the beam phase space area.

The electron cooling system includes an electron injector which injects an electron beam into the storage ring, into the path of the particle beam, and an electron capture which captures the electron beam. The electrons are injected with a predetermined amount of energy to cause the projectile particles to move at an ideal velocity. By travelling and interacting with the particle beam, the electron beam maintains the particle beam within parameters that optimizes end-product production. Any heating, scattering and even deceleration that would otherwise adversely affect the particles stored in the system is effectively compensated for by the electron beam. Accordingly, scattering and energy loss in the beam is substantially continuously compensated for before significant instabilities have an opportunity to develop. In this manner, events that would typically cause significant instabilities in the particle beam are minimized if not eliminated.

In accordance with additional features of the present invention, beam stops associated with conventional accelerators are no longer used, thereby obviating measures typically desirable for cooling the beam stops. Moreover, through control of the particle supply and the electron cooling system, the energy level of the particle beam may be controlled for optimizing production of selected end-products.

Other features and advantages of the present invention will become apparent from the following detailed description of the preferred embodiments, taken in conjunction with the accompanying drawing, which illustrate by way of example the principles of the invention.

BRIEF DESCRIPTION OF THE DRAWING

The invention is explained in more detail below with reference to the accompanying drawing in which.

DESCRIPTION OF THE PREFERRED EMBODIMENTS

Figure 1:
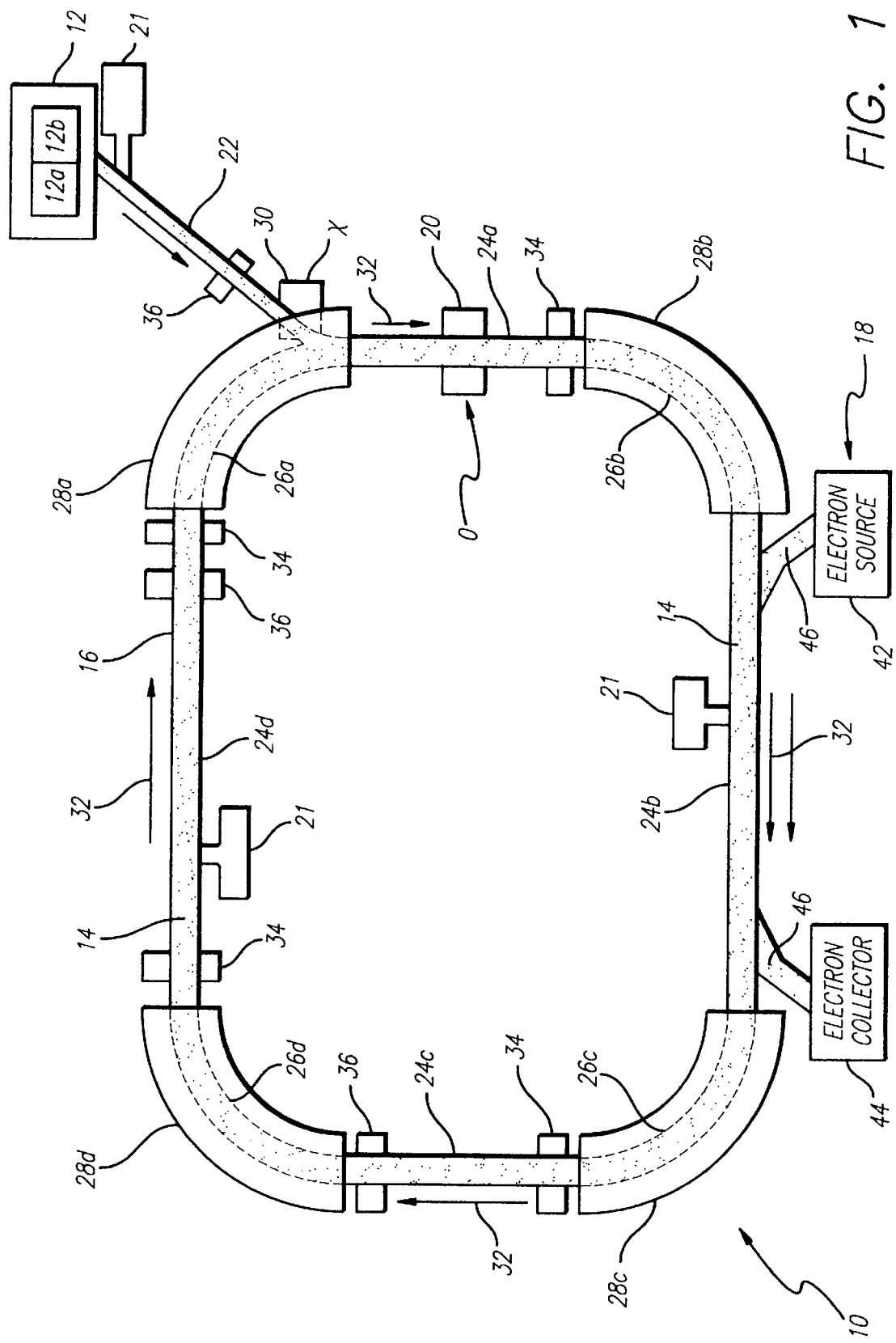
FIG. 1 is a schematic view of a system for use in the invention.

A storage ring system 10 for high-yield production of nuclear particles, including neutrons, isotopes and photons, and for generating desired end-products with improved efficiency and reduced hazardous by-products is shown in FIG. 1. The storage ring system 10 utilizes a combination of elements, including a particle supply 12 for supplying a beam of projectile or reaction particles 14, a storage ring 16 for containing the projectile particles 14, an electron cooling system 18 for stabilizing the projectile particles 14, and a target 20 for bombardment by the projectile particles 14. Vacuum pumps 21 are also provided within the system 10 to maintain subatmospheric pressure within the ring 16. While FIG. 1 shows three vacuum pumps 21, their plurality, as well as their locations within the system, is not limited to that shown in FIG. 1.

For supplying the projectile particles 14, the particle supply 12 includes an ion source 12a and an injector 12b, such as, a cyclotron or RFQ, whose outlet 22 feeds into the ring 16 at point x. In accordance with a feature of the invention, the particle supply 12 continuously injects a relatively low current of particles 14 into the ring 16, throughout the operation of the system 10. Once injected into the ring 16, newly-injected ions merge with any previously injected ions circulating inside the ring 16, to increase the size (and/or density) of the particle beam.

For example, in the case where the desired end products are neutrons, negatively-charged deuterium ions may be injected into the ring 16 from the particle supply 12. Being uncharged and of high energy, the neutrons pass through the walls of the ring 10. Likewise, where the desired end emission or products are photons or gamma rays, negatively-charged hydrogen ions may be injected into the ring 16 from the particle supply 12. The details of the neutron or photon distribution in velocity and angle depend on the choice of stored particle 14 and target 20 materials.

The ring 16 is configured as a closed structure so that newly-injected projectiles can enter the ring 16 and join any previously-injected projectiles. As the beam path defined inside the ring 16 substantially closes upon itself, it impractical to distinguish between the beginning or the end of the beam path. However, for purposes of describing the invention, the location 0 is referenced here as the "beginning" of the ring 16.

In order to minimize size, weight, power and/or cost, the storage ring 16 is rectangularly shaped with four linear segments 24a, 24b, 24c and 24d connected by four curved segments 26a, 26b, 26c and 26d. In this regard, it will be observed that the particles 14 described here as "circling" or "circulating" the ring 16, or the like, are being described merely as completing revolutions around the ring 16, and not necessarily doing so in a "circular" pattern. In one embodiment of the ring 16, longer linear segments 24b and 24d may measure approximately 2.4 meters, shorter linear segments 24a and 24c approximately 1.6 meters, and the curved segments 26a, 26b, 26c and 26d approximately 0.8 meters. Overall, an area defined by the ring 16 may measure approximately 3.5 meters by 2.5 meters. The ring 16 may be constructed of known materials used in the construction of conventional accelerators.

As the particles 14 are injected into the ring 16, their otherwise typical linear direction of motion along the linear segments 24a–24d is intermittently manipulated by a plurality of dipoles 28a, 28b, 28c and 28d positioned adjacent the curved segments 26a–26d of the ring 16. Under the influence of the magnetic field of the dipoles 28a–28d, the particles 14 are directed to curve substantially along a path of a predetermined radius or bend at the curved segments 26a–26d. Depending on the charge of the projectile particles 14 and the field of the dipoles 28a–28d, the system 10 manipulates the projectiles to circulate the ring 16 in either a clockwise or a counterclockwise direction.

Trim magnets 34 may be provided to correct for the effects of the earth's magnetic field, errors in the main system magnets and beam intensity (space charge) effects. Moreover, diagnostic equipment 36, such as current toroids, beam profile monitors, split Faraday rings or beam position monitors (BPM's), may also be provided to tune the system, aid in initial start-up, and monitor operation.

Depending on the charge of the projectile particles 14 as they initially enter the ring 16, a merging dipole 30, which can be part of the dipole 28a, may be situated adjacent to the outlet 22 of the ion source to appropriately direct or guide the new particles for successful entry into the ring 16. Once inside the ring 16, the particles merge with any other ions present in the ring 16 and together circle the ring 16. In the system 10 shown in FIG. 1, the projectile particles 14 are manipulated in accordance with their charge to travel in a clockwise direction around the ring 16, as indicated by arrows 32.

In the deuterium example set forth above, where neutrons are the desired end products, the negatively-charged deuterium ions are directed to curve toward the left in FIG. 1, by the merging dipole 30 (and/or the dipole 28a) as they enter the storage ring 16. However, as explained below in further detail, the deuterium ions are converted into positively-charged deuterons as they pass through an $O^{16}$ target. As positively-charged deuterons, they are directed by the ring dipoles 28a–28d to curve toward the right, around the ring 16 in a clockwise direction.

In the negative hydrogen ion example set forth above, where photons are the desired end products, the negatively-charged hydrogen ions are also directed to curve toward the left in FIG. 1, by the merging dipole 30 (and/or the dipole 28a) as they enter the storage ring 16. As they pass through the target, they are converted into positively-charged hydrogen ions, or protons. As protons, they are directed by the ring dipoles 28a–28d to curve toward the right around the ring 16 in a clockwise direction.

Once the particles 14 are injected into the ring 16, the generation of the desired end products by the system 10 is initiated. In accordance with a feature of the invention, most of the projectile particles 14 once injected into the ring 16, circle the ring 16 continuously such that those particles failing to react with the target 20 are guided around the ring 16 for repeated encounters with the target 20. These encounters typically continue until the particles either react with the target 20, or are lost in the ring 16 due to scattering.

As in typical accelerator reactions, the desired end products are produced in the system when the projectile particles 14 collide with the target 20 at an optimal energy level. However, in contrast to linear accelerators (resonant or electrostatic), which typically enable only single passes or encounters between the projectile particles and the target 20 (where the bulk of the projectile particles typically fails to appropriately hit a target constituent), the present invention advantageously enables multiple-passes, or repeated encounters between the projectile particles 14 and the target 20. Accordingly, among other advantages offered by the present invention, the target 20 may be relatively thinner than conventional targets, because the projectile particles 14 remain useful even if they initially fail to properly collide with the target 20. In that regard, the present invention through the "endless" particle beam stored by the ring 16, enables the particles 14 to have additional passes through the target 20, while maintaining the particle beam in optimal conditions for successful reaction between the particles and the target 20.

During the initial operating period of the system 10, the total rate of loss due to reaction and scattering is less than the rate of particle replacement. However, as the beam intensity, i.e. beam density, increases with the addition of new particles, the beam intensity eventually reaches a maximum. Thus, after the initial operating period, equilibrium between loss and replacement is eventually reached within the system 10. Thereafter, the intensity idealistically remains substantially constant, as particles 14 lost through reaction or scattering are substantially replaced through the continuous injection of new particles by the particle supply 12. It is understood by one of ordinary skill in the art that beam bunching or other planned beam density variations can alter the constant intensity of the beam if desired. In accordance with a feature of the invention, the system 10 utilizes a relatively low injection current to achieve the desired beam energy.

It is noted that in certain instances, the target 20 may serve as a charge converter, as well. In the example of the deuterium ion, deuterium ions upon entry into the ring 16 are first converted into positively-charged deuterons, by an $O^{16}$ gas jet (containing oxygen isotope 16 (natural oxygen)) that also serves as the target 20. Thereafter, as the positively-charged deuterons circle the ring 16 and re-encounter the $O^{16}$ gas jet, the gas jet reacts with the deuterons to produce the desired neutrons via the $O^{16}(d,n)F^{17}$ reaction. To enable the deuterons to circle in the ring 16, the ring dipoles 28a–28d may have a dipole bend radius of approximately 0.5 meters, a dipole bend field of approximately 7.3 kilogauss, and an internal gradient $\_\frac{dB}{dx}\frac{r_0}{B_0}$ of approximately 0.5.

The target 20 may serve as a charge converter in the case of the hydrogen ion, as well. As the negatively-charged hydrogen ions enter the ring 16, they are first converted into protons by a gas jet containing carbon or $C^{13}$ (carbon isotope 13) that also serves as the target 20. Thereafter, as the protons circle the ring 16 and re-encounter the gas jet, the gas jet reacts with the protons to produce the desired photons via the $C^{13}(p,\gamma)N^{14}$ reaction. To enable the protons to circle in the ring 16, the ring dipoles 28a–28d may have a dipole bend radius of approximately 0.5 meters, a dipole bend field of approximately 3.8 kilogauss, and an internal gradient $\_\frac{dB}{dx}\frac{r_0}{B_0}$ of approximately 0.5.

Depending on the projectile particles, the target 20 may be a thin film, other types of gas or liquid jets, or thin liquid flows to provide appropriate target constituents. A thin film target may also be positioned with one of the dipoles.

In accordance with a feature of the invention, the number of circulating particles 14 increases with each revolution around the system 10 until equilibrium is obtained. In the embodiment shown in FIG. 1, the circulating particles 14 merge with newly-injected particles as they approach location X. Thus, just prior to encountering the target 20 at location 0, the particle beam is substantially at its maximum intensity and density. Moreover, the target 20 (situated downstream of the outlet 22 of the particle supply 12) is exposed to both previously-injected particles 14, as well as newly-injected particles.

In the deuterium example, newly-injected deuterium ions are mixed with circulating deuterons before they both reach the target 20. At the gas jet, the newly-injected deuterium ions may react with the $O^{16}$ gas jet to form desired neutrons. It will be appreciated that any deuterium which fails to lose its electrons in the gas jet will most likely not receive proper deflection by the ring dipoles 28a–28d for successful clockwise navigation around the ring 16. Accordingly, in this example, the beam which travels and builds up in the system 10 consists primarily of positively-charged deuterons.

As for the hydrogen ion example, newly-injected negative hydrogen ions are mixed with circulating protons before they both reach the target 20. At the gas jet containing carbon or $C^{13}$, the newly-injected hydrogen ions may react with the gas jet for producing photons. However, any negative hydrogen ion which fails to lose its electrons will not receive proper deflection by the ring dipoles 28a–28d. Accordingly, the beam which travels and builds up in the system 10 consists primarily of protons.

Although the dipoles 28a–28d focus and steer the beam both horizontally and vertically, the particles 14 of the beam nevertheless experience small-scale scattering due to collisions and magnetic imperfections of the dipoles. If left unattended, such scattering could significantly hamper the utility of the system 10. Continuous small-angle scattering would eventually lead to large-angle scattering which would in turn raise the temperature of the beam to uncontrollable or otherwise undesirable levels. Moreover, as the charged particles 14 pass through the target 20, some particles tend to be decelerated below the threshold or desired energy for generating nuclear reactions, or below the operating energy of the ring 16, and thus may require acceleration before they reencounter the target 20.

In order to maintain the proper beam angles and optimal energy levels for generating the desired end products, the electron cooling system 18 is provided as a feature of the present invention. As described below, the electron cooling system 18 maintains stability in the particle beam and enables the system 10 to generate and store a relatively high intensity particle beam, with a relatively low intensity input particle beam. The system 10 would typically operate with a beam intensity of approximately 100 mA DC. Of course, the intensity may be varied by varying selected parameters of the system 10, e.g., the current of the new particles, the type of target, the electron cooling current, the particle energy, the particle type, etc.

As shown in FIG. 1, the electron cooling system 18 includes a electron source 42 that emits electrons 46 (e.g., an electron gun) and an electron capture device or collector 44. The electron source 42 and the electron collector 44 are situated toward opposing ends of a linear segment, e.g., linear segment 24b. Moreover, multiple electron cooling systems may be used in the system, as desired, and they may be situated along the other linear segments of the ring 16. In that regard, each electron cooling system may have the linear segment to itself or share the linear segment with another electron cooling system.

In accordance with a feature of the invention, the electrons injected from the electron cooling system are superimposed on the particle beam as it travels through the linear segment 24b. The electrons are injected into the linear segment 24b at an energy level enabling a velocity reflecting an ideal particle beam velocity. Having significantly lower mass than the typical projectile particles, the electrons 46 behave much like "golf balls" against the "bowling balls" of the projectiles 14. As the electrons 46 intermingle and collide with the projectile particles 14, excessive energy in the latter, including the high temperature of the particle beam, is transferred to or "cooled" by the electrons 46. The projectile particles are substantially forced to travel at velocities similar to the electrons. "Sluggish" particles decelerated by the target 20 may be reaccelerated by the electrons. Overall, the electrons bring the projectile particles 14 into equilibrium with the electron velocities.

In various embodiments of the system 10, the electron beam superimposed on the particle beam has an energy of approximately 1 keV and a current of approximately 1 A and the collector 44 is a depressed Faraday cup. The electron beam may be guided by a solenoid field and may be formed at higher energy and decelerated prior to entering the linear segment 24b.

Without the electron beam the projectile particles tend to scatter off each other, the target 20, and the ions in the residual background gas of the system 10. Additionally, small errors in the dipole magnetic field would tend to kick the particles with each revolution around the ring 16. Without the electron cooling system 18, scatterings and kicks could increase quickly and cause significant particle loss. An RF cavity be used in conjunction with the electron cooling system 18.

Although the trim magnets 34 and diagnostic equipment 36 are typically positioned along the segments 24a, 24c and 24d only in FIG. 1, they may be positioned along the segment 24a, as well, particularly where the electron overlap in segment 24a is shorter than that shown in FIG. 1.

In operation, the particle supply 12 of the system 10 begins to supply the projectile particles 14 and the particles are accelerated and injected into the segment 24a of the ring 16 through the outlet 22. As these initial projectile particles are injected, and deflected into the ring 16, other particles follow as the particle supply 12 continuously injects a low current of charged particles into the ring 16. Being injected, the particles 14 are accelerated to a predetermined energy level for optimizing production of the desired end products. Depending on the initial charge of the particles as they leave the particle supply 12, the particles' direction of travel may be manipulated by the merging dipole 30 (and/or the dipole 28a) positioned at the outlet 22. These projectile particles may or may not encounter a charge converter as they enter the ring 16. Once in the ring, the majority of the particles 14 begins to circle the ring 16, travelling "downstream" to encounter the target 20.

When the particles 14 encounter the target 20 along the segment 24a, they may or may not collide with the target 20 to produce the desired end-products. Those that collide with the target 20 may undergo nuclear reactions and those that fail to collide may pass through the target 20 and travel downstream in the ring 16. In contrast to conventional accelerators where unreacted particles are simply captured in a beam stop and later disposed of, the present invention recycles unreacted particles 14. With the closed storage ring 16 enabling an "endless" particle beam, the system allows unreacted particles 14 for further and repeated encounters with the target 20. In particular, the storage ring 16 providing an unobstructed closed particle path allows the unreacted particles 14 to go uncollected if they pass the target without reaction and to continue their travel downstream past the target 20, where they encounter the ring dipoles 28a–28d.

Because a fraction of the particles 14 successfully react with the target 20, this loss causes a reduction or drop in the beam intensity, as shown greatly exaggerated in FIG. 1, along curved segment 26b. Moreover, the particle beam composed of the remaining particles may be somewhat unstable as a result of passage through the target 20 and the ring dipole 28b. Accordingly, to prevent significant instabilities from developing within the particle beam, the particle beam is exposed to the stream of "cooling" electrons injected into its path along the linear segment 24b. It is understood by one of ordinary skill in the art that the cooling can take place in any, or any combination, of the straight segments 24a–24d.

As the particles 14 encounter the electrons 46, they intermingle and collide with the electrons that either impart energy to the particles, or absorb excess energy from the particles, to restabilize the particle beam. In that regard, the electrons are injected into the particle beam with a predetermined energy level to restabilize the particles and bring the particles back into their ideal energy level for successful reaction with the target 20.

As the particles approach the ring dipole 28c, the electrons 46 are captured by the electron collector 44. As the particles pass through the linear segment 24c and then the linear segment 24d in completing a revolution around the ring 16, the particles reemerge along the segment 24a where they encounter newly-injected particles from the particle supply 12. As these particles merge with each other, the beam intensity rebounds, as shown greatly exaggerated in FIG. 1, along linear segment 24a, and both newly and previously injected projectiles proceed toward the target 20. Again, as the particles pass through the target 20, those which fail to react with the target 20 to produce the desired end products are recycled in the ring 16 for subsequent passes through the target 20 in the manner described above.

Advantageously, by capturing the particle beam in the storage ring 16, the present invention allows the vast majority of particles 14 that fail to react with the target 20 to be reused, again and again, until they either react to produce the end-products or are lost through the rare events of hard scattering or charge exchange. Furthermore, in contrast to conventional techniques, there is no primary spent beam typically requiring disposal or dumping into a beam stop, which further typically require cooling, and special handling due to radioactivity.

Since unreacted particles are recirculated until used or otherwise lost, the present invention enables the storage of a relatively high intensity beam, even though a relatively low intensity beam is used to populate the system 10. Accordingly, it is a feature of the present invention to provide relatively high product yields without assembling a high power accelerator, which leads to significant advantages in size, weight, power, and cost. For deuterium ions, the stored deuteron beam current within the system 10 may be approximately 0.25 Amperes, with a deuteron beam energy of approximately 3.2 MeV. For the hydrogen ions, the stored proton beam current within the system 10 may be approximately 0.25 Amperes, with a proton beam energy of approximately 1.75 MeV.

Figure 2:
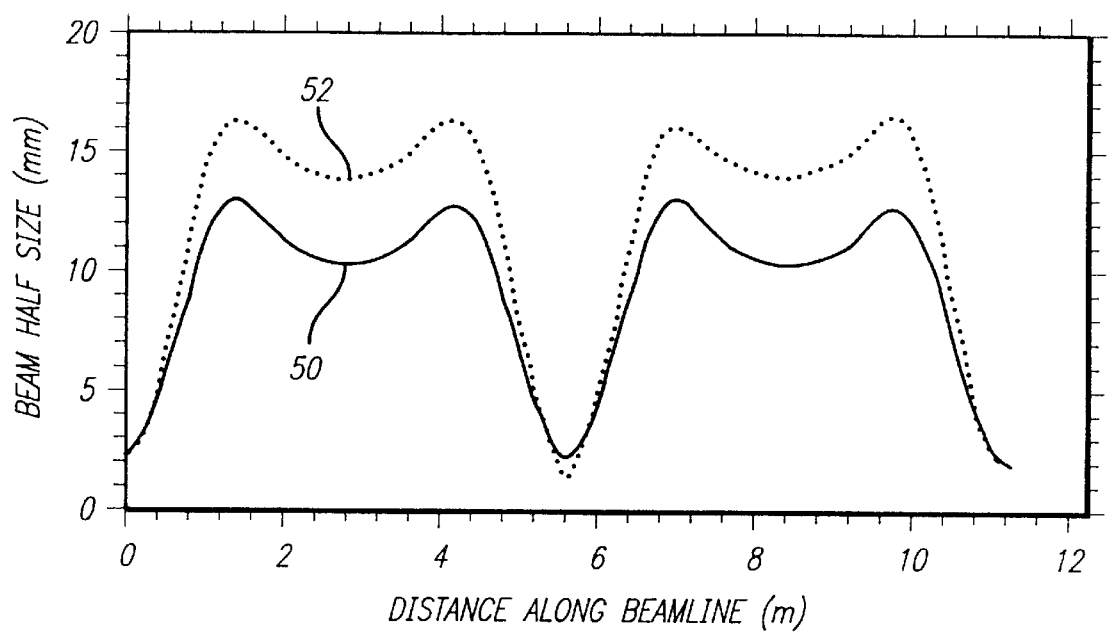
FIG. 2 is a graph illustrating a beam size as a function of position within a ring of the system.

As mentioned, the ring 16 may be structured in numerous configurations. The configuration of the ring 16 itself, along with the dipoles 28a–28d, may affect various characteristics of the beam. For both the deuterium beam and the proton beam, the size of a beam (y-axis) is a function of position within the storage ring 16 (x-axis), as illustrated in FIG. 2. Note that the zero value of the x-axis corresponds substantially to the location 0 of linear segment 24a with increasing value corresponding to travel around the ring 16 in a clockwise direction.

In FIG. 2, a solid line 50 represents horizontal beam half size and dotted line 52 represents vertical beam half size. The beam forms a relatively small waist horizontally in the short linear segments 24a and 24c of the ring 16 (i.e., the "low valleys" centered around x=0 x=6 m, and x=12 m), and a relatively larger, gentler waist in the longer linear segments 24b and 24d of the ring 16 (i.e., the "high valleys" around x=2.5 m and x=8.5 m). Note that the horizontal size of the beam peaks at four locations substantially coinciding with the four curved segments 28a–28d.

Figure 3:
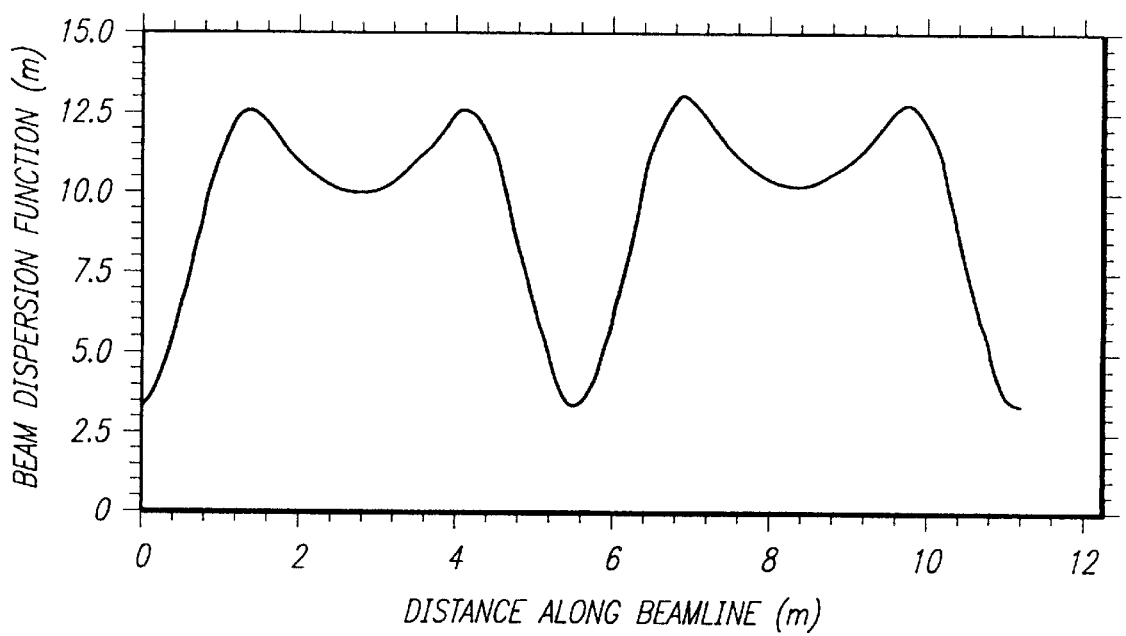
FIG. 3 is a graph illustrating a beam dispersion as a function of position within the ring.

Vertical focusing is typically less than the horizontal focusing in this lattice, due to end effects of the dipoles 28a–28d. Referring to FIG. 3, dispersion of a beam as a function of position within the storage ring 16 is illustrated. The beam has relatively smaller dispersion in the short linear segments 24a and 24c of the ring 16 (i.e., the "low valleys"), and a relatively larger, less varied dispersion in the longer linear segments 24b and 24d of the ring 16 (i.e., the "high valleys"). FIGS. 2 and 3 do not include the effect of the electron beam on the ion optics in the example shown. The electron beam self fields will likely cause a shift of both the size evolution (FIG. 2) and the dispersion evolution (FIG. 3) and will substantially depend on the parameters of the electron system.

As noted above, the particles 14 in the storage ring 16 undergo many collisions that may randomly increase their velocity spreads. Three principle causes for beam heating are multiple scattering off residual gas particles 14 in the vacuum chamber, multiple scattering off particles in the target 20 gas, and internal scattering within the particle beam itself. Of these three scattering causes, multiple scattering off the target 20 is perhaps dominant in causing beam heating. As demonstrated below, beam heating due to target 20 scattering is a significant factor for consideration, which, without treatment by the electron cooling system 18, would adversely affect operation and utility of the present invention.

A known expression for the multiple scattering angular growth of a beam as it passes through matter is given as:

$$\Delta<\Theta^2>=4\ \pi N(2zZe^2/Mv^2)^2\ \ln\ (204\ Z/^{1/3})\ t \qquad \text{Eq.(1)}$$

In Eq. (1) N is the number of scattering atoms per unit volume, z is the charge on the incident beam particles, Z is the atomic number of the scattering atoms, e is the charge of the electron 46, M is the mass of the incident particles 14, v is the velocity of the incident particles 14, and t is the thickness of the scattering matter.

Where the beam is composed of deuterons and the scattering particles are oxygen atoms, z=1 and Z=8. Using gaussian units where $e^2/Mc^2=r_D$ and $r_D$ is the classical radius of deuterons of $7.51\times10^{-17}$ cm, Equation (1) can be rewritten as:

$$\Delta<\Theta^2>=4\ \pi N(16r_D/\beta^2)^2\ \ln\ (102)\ t \qquad \text{Eq.(2)}$$

For 3.2 MeV deuterons, with c the speed of light, β=v/c which is $5.833\times10^{-2}$. In this instance, the target 20 consists of a gas jet where t=2 cm thick and the pressure is one Torr. At one Torr there are $3.54\times10^{16}$ molecules per $cm^3$, or, since Oxygen gas consists of two Oxygen atoms per molecule, $N=7.08\times10^{16}\ cm^{-3}$. Substituting these values into Eq. (2), it follows that $\Delta<\Theta^2>=1\times10^{-6}$.

If an assumption is made that the equilibrium emittance of the deuteron beam is negligible after cooling (an assumption which holds in the case of single turn or pass cooling) then the emittance of the beam after it passes through the gas target 20 is:

$$\Delta\epsilon=\pi x\Delta\Theta=2\ \pi\ \text{mm-mr.} \qquad \text{Eq.(3)}$$

In Equation (3), x is 2 mm. This can be seen in FIG. 2; in order to minimize emittance growth the target 20 is placed where the beam is smallest, i.e., at the mid-location M of the segment 24a. ΔΘ has just been calculated from Equation (2) as ΔΘ=1 mr. Equation (3) is the rms transverse beam heating of the beam due to its interaction with the gas jet target 20.

Where the beam is composed of protons and the scattering particles are carbon atoms, Equation (1) becomes:

$$\Delta<\Theta^2>=4\ \pi N(16r_p/\beta^2)^2\ \ln\ (112)t\ \text{Eq.(4)}$$

where z=1, Z=6 and the classical radius of protons=$7.51\times 10^{-17}$ cm.

For 1.75 MeV proton, with c the speed of light, β=v/c= $6.100\times10^{-2}$. In this instance, the target 20 consists of a gas jet t=0.5 cm thick, with a pressure of one Torr. Since $C_2H_4$ gas consists of two Carbon atoms per molecule, N is $7.08\times10^{16}\ cm^{-3}$. (Since the scattering depends on $Z^2$ the hydrogen does not contribute substantially to the scattering.) Substituting these values into Eq. (4), it follows that $\Delta<\Theta^2>=0.5\times10^{-6}$.

If an assumption is also made here that the equilibrium emittance of the proton beam is negligible after cooling (an assumption which holds in the case of single turn or pass cooling) then the emittance of the beam after it passes through the $C_2H_2$ gas target is:

$$\Delta\epsilon=\pi x\Delta\Theta=1.4\ \pi\ \text{mm-mr.} \qquad \text{Eq. (5)}$$

In Equation (5), x is 2 mm. This again can be seen in FIG. 2; in order to minimize emittance growth the target 20 is placed where the beam is smallest, i.e., at the mid-location M of the segment 24a. ΔΘ has just been calculated from Equation (2) as ΔΘ=0.7 mr. Equation (5) is the rms transverse beam heating of the beam due to its interaction with the gas jet target containing carbon or $c^{13}$.

As shown below, the electron cooling system 18 is also desirable for offsetting beam energy loss due to target 20 interaction and particle straggling due to target 20 interaction. In that regard, another known expression for the average beam energy loss as it traverses matter is:

$$dE/dx = [4\pi N Z z^2 e^4/mv^2] \ln(b_{max}/b_{min}) \qquad \text{Eq. (6)}$$

For the deuteron beam, m is the mass of the electron 46, $b_{max}=\gamma v/\omega$, $b_{min}=ze^2/\gamma mv^2$, $\gamma=(1-\beta^2)^{-1/2}$, and ω is the classical frequency of electron revolution about the Oxygen nucleus. Since ω appears within the logarithm it can be estimated that all of the Oxygen atoms have a binding energy of hbarω=10 eV, which leads to $\omega=1.53\times10^{16}$ $s^{-1}$ With this estimate, $b_{max}=\gamma v/\omega=1.14\times10^{-9}$ m. The other quantity appearing in the Coulomb log is $b_{min}=ze^2/\gamma mv^2= 8.3\times10^{-3}$ m. Thus the Coulomb log becomes $\ln(b_{max}/b_{min}) =7.3$. (Changes in hbarω of a factor of 10 result in changes in the Coulomb log of about 2. Thus, the calculation of dE/dx is relatively insensitive to changes in the assumed value of hbarω.) Substituting in 7.3 for the Coulomb log, and recalling that Equation (6) is in gaussian units, the replacement $r_e=e^2/mc^2$ can be made in Eq. (6) resulting in:

$$dE/dx = 4\pi N Z z^2 r_e^2 mc^2 7.3/\beta^2 = 620 \text{ eV/cm} \qquad \text{Eq. (7)}$$

Thus, the deuteron beam is expected to lose an rms value of 1240 eV when it passes through the 2 cm, 1 Torr, Oxygen gas target 20. The straggling causes an rms energy spread about equal to the rms energy loss.

$$\Delta E = \delta E = 1240 \text{ eV} \qquad \text{Eq. (8)}$$

Applying Equation (6) to the proton beam, m=the mass of the electron 46, $b_{max}=\gamma v/\omega$, $b_{min}=ze^2/\gamma mv^2$, $\gamma=(1-\beta^2)^{-1/2}$, and ω is the classical frequency of electron revolution about the Carbon nucleus. The quantity ω is still $1.53\times10^{16}$ $s^{-1}$ and $b_{max}$ is approximately $10^{-9}$ m. The $b_{min}=ze^2/\gamma mv^2=7.6\times10^{-13}$ m. Thus, the Coulomb log becomes $\ln(b_{max}/b_{min})=7.2$. (Again, changes in hbarω of a factor of 10 result in changes in the Coulomb log of about 2. Thus, the calculation of dE/dx is relatively insensitive to changes in the assumed value of hbarω.) Substituting in 7.2 for the Coulomb log, and recalling that Equation (6) is in gaussian units, the replacement $r_e=e^2/mc^2$ can be made in Equation (6) resulting in:

$$dE/dx = 4\pi N Z z^2 r_e^2 mc^2 7.2/\beta^2 = 420 \text{ eV/cm} \qquad \text{Eq. (9)}$$

Thus, the proton beam is expected to lose an rms value of 210 eV when it passes through the 0.5 cm, 1 Torr, $C_2H_2$ gas target 20. The straggling causes an rms energy spread about equal to the rms energy loss.

$$\Delta E = \delta E = 210 \text{ eV} \qquad \text{Eq.(10)}$$

For transverse beam cooling using the process of electron cooling, the equation for the cooling time is:

$$t_{cool} = \gamma^2 a^2 \beta e(\epsilon_{nx})^3 C/120 \pi^3 r_d r_e C I x^3 \qquad \text{Eq. (11)}$$

In Eq. (11) a is the radius of the electron cooling beam, $\epsilon_{nx}$ is the normalized emittance of the deuterium beam, $\epsilon_{enx}$ is the normalized emittance of the electron beam, $r_d$ is the classical radius of the deuteron, $r_e$ is the classical radius of the electron, L is the length of the ring 16 used for cooling (1.33 meters here), C is the ring perimeter (11.1 meters), I is the electron cooling current, and x is the radius of the beam being cooled. In the embodiment of the system discussed herein, the cooling occurs along the long segment 24b, where a =x=10 mm. For 3.2 MeV deuterons, $\beta=5.833\times10^{-2}$. A straight forward electron cooling current to achieve is I=1 amp. Typical injectors have normalized emittances of the deuteron beam of $\epsilon_{nx}=0.5$ π mm-mr. This leaves the time required to cool the initial beam as:

Initial Cooling Time=3.8 micro seconds  Eq. (12)

The time it takes the deuterons to circulate the storage ring 16 is given by the perimeter divided by the particle velocity, 11.1 m/βc=0.63 micro seconds. It therefore takes approximately six turns or passes for the deuterons to be cooled after injection.

Once injected, it was calculated above in Eq. (3) that the beam emittance increases by 2 π mm-mr per turn, which is an increase in the beam normalized emittance of 0.116 π mm-mr per turn. Substituting this emittance into Eq. (11) leads to the conclusion that once the beam reaches equilibrium it is substantially cooled in a single pass. The realm of single pass cooling distinguishes the system 10, wherein a stored beam may be treated as a single pass beam from the standpoint of instabilities and resonances.

Cooling time for 2(sigma) scattered beam = 0.38 micro seconds  Eq.(13)

Applying Equation 11 to the proton beam, a is the radius of the electron cooling beam, $\epsilon_{nx}$ is the normalized emittance of the proton beam, $\epsilon_{enx}$ is the normalized emittance of the electron beam, $r_p$ is the classical radius of the proton, $r_e$ is the classical radius of the electron. For 1.75 MeV protons, $\beta=6.10\times10^{-2}$. A straight forward electron cooling current to achieve is I=1 amp. Typical injectors have normalized emittances of the proton of $\epsilon_{nx}=0.5$ π mm-mr. This leaves the time required to cool the initial beam as:

Initial Cooling Time=1.2 micro seconds  Eq. (14)

The time it takes the protons to circulate the storage ring 16 is given by the circumference divided by the particle velocity, 11.1 m/βc=0.6 micro seconds. It therefore takes approximately two turns or passes for the protons to be cooled after injection.

Once injected, it was calculated above in Eq. (5) that the beam emittance increases by 1.4 π mm-mr per turn, which is an increase in the beam normalized emittance of 0.0854 π mm-mr per turn. Substituting this emittance into Eq. (11) leads to the conclusion that once the beam reaches equilibrium it is substantially cooled in a single pass. The realm of single pass cooling distinguishes the system 10, wherein a stored beam may be treated as a single pass beam from the standpoint of instabilities and resonances.

Cooling time for 2σ scattered beam=48 nanoseconds  Eq. (15)

For most beams, it is observed that the cooling time of Equation (11) is proportional to $\beta\gamma^2$ and to $\epsilon_{nx}^3$. At equilibrium the beam emittance, $\epsilon_{nx}$, tends to be relatively small. It is also observed that the linear segment 24b of the ring 16 of FIG. 1 devoted to cooling is relatively large. This combination of parameters substantially assures fast cooling times.

As concerning longitudinal beam cooling and acceleration, electron cooling applies in all three phase space planes. The relevant quantity in determining the electron cooling rate is the velocity of the ion as evaluated in a frame moving along with the electron beam. The equations that make the velocity transformation from the lab frame to the moving frame are:

$$\beta_{s*} = \beta(\Delta p/p) \text{ and } \beta_{x*} = \epsilon_{nx}/\pi x \qquad \text{Eq. (16)}$$

In Equation (16) the * denotes quantities evaluated in a frame moving along with the electron beam. At injection of the deuterium, it is expected that $\epsilon_{nx}=0.5 \pi$ mm-mr and $\Delta p/p=0.1\%$. With $\beta=5.833\times10^{-2}$, it follows that at injection:

$$\beta_{s*} \text{ is } 5.833\times10^{-5} \text{ and } \beta_{x*}=5\times10^{-5} \qquad \text{Eq. (17)}$$

After passing through the gas jet target $\epsilon_{nx}=0.116 \pi$ mm-mr and $\Delta p/p=1.9\times10^{-4}$. Substituting these values into Eq. (10), it follows that after target interaction:

$$\beta_{s*}=1.13\times10^{-5} \text{ and } \beta_{x*}=1.16\times10^{-5} \qquad \text{Eq. (18)}$$

In addition to the initial momentum spread and the momentum spread caused by target interaction, there is a momentum spread due to the space charge potential of the beam. The potential energy difference between the center of a round beam and the beam edge is given by the expression $\Delta V = 30I/\beta$, where I is in Amperes and $\Delta V$ is in Volts. For the deuteron beam, it follows that from space charge:

$$\Delta E_{sc}=128 \text{ eV} \qquad \text{Eq. (19)}$$

In view of the foregoing, Table 1 below presents a tabulation of the heating and cooling parameters for high yield neutron production by the system 10.

TABLE 1

Heating and Cooling Parameters of High Yield Neutron Production Storage Ring.

| | |
|---|---|
| Ring Perimeter | C = 11.1 meters |
| Cooling Segment within 24b | L = 1.33 meters |
| Deuteron Beam Energy | 3.2 MeV |
| Electron Beam Energy | 869 eV |
| Beam Velocity Divided by Speed of Light | $\beta = 5.833 \times 10^{-2}$ |
| Electron Beam Radii in Cooling Straight | a = 10 mm |
| Deuteron Beam Radii in Cooling Straight | x = 10 mm |
| Deuteron Beam Current | $I_d$ = 0.25 Ampere |
| Electron Cooling Current | $I_e$ = 1 Ampere |
| Injected Deuteron Normalized Emittance | $\epsilon_{nx}$ = 0.5$\pi$ mm-mr |
| Deuteron Emittance Growth in Target | $\Delta\epsilon_{nx}$ = 0.116$\pi$ mm-mr |
| Injected Deuteron Energy Spread | $\Delta E$ = 6.4 keV |
| Deuteron Energy Loss in Target | $\Delta E$ = 1240 eV |
| Energy Spread Caused by Target | $\delta E$ = 1240 eV |
| Deuteron Space Charge Energy Spread | $\delta E_{sc}$ = 128 eV |
| Deuteron Revolution Time | T = 0.63 $\mu$sec |
| Cooling Time for Injected Deuterons | $t_{cool}$ = 3.8 $\mu$sec |
| Cooling Time for Target Caused, 2$\sigma$ Velocity Growth | $t_{cool}$ = 0.38 $\mu$sec (Single turn cooling) |

It can be seen that the energy spread caused by space charge within the beam is substantially less than the energy spread caused by the beam interaction with the target 20.

Applying Equation 16 to the proton beam, it is expected that $\epsilon_{nx}=0.5 \pi$ mm-mr and $\Delta p/p=0.1\%$. With $\beta=6.10\times10^{-2}$. Thus, at injection:

$$\beta=6.10\times10^{-5} \text{ and } \beta_{n*}=2.94\times10^{-5} \qquad \text{Eq. (20)}$$

After passing through the gas jet target $\epsilon_{nx}=0.085 \pi$ mm-mr and $\Delta p/p=6\times10^{-5}$. Substituting these values into Eq. (16), it follows that after target interaction:

$$\beta_{s*}=3.66\times10^{-6} \text{ and } \beta_{x*}=5\times10^{-6} \qquad \text{Eq. (21)}$$

Again, in addition to the initial momentum spread and the momentum spread caused by target interaction, there is a momentum spread due to the space charge potential of the proton beam. The potential energy difference between the center of a round beam and the beam edge is given by the expression $\Delta V = 30I/\beta$, where I is in Amperes and $\Delta V$ is in Volts. For the proton beam, it follows that from space charge:

$$\Delta E_{sc}=123 \text{ eV} \qquad \text{Eq. (22)}$$

The energy spread caused by space charge within the proton beam is likewise substantially less than the energy spread caused by the beam interaction with the target 20.

In view of the foregoing, Table 2 below presents a tabulation of the heating and cooling parameters for high yield photon production by the system 10.

TABLE 2

Heating and Cooling Parameters of High Yield Gamma Ray Production Storage Ring.

| | |
|---|---|
| Ring Perimeter | C = 11.1 meters |
| Cooling Segment within 24b | L = 1.33 meters |
| Proton Beam Energy | 1.75 MeV |
| Electron Beam Energy | 951 eV |
| Beam Velocity Divided by Speed of Light | $\beta = 6.1 \times 10^{-2}$ |
| Electron Beam Radii in Cooling Straight | a = 17 mm |
| Proton Beam Radii in Cooling Straight | x = 17 mm |
| Proton Beam Current | $I_p$ = 0.25 Ampere |
| Electron Cooling Current | $I_e$ = 1 Ampere |
| Injected Proton Normalized Emittance | $\epsilon_{nx}$ = 0.5$\pi$ mm-mr |
| Proton Emittance Growth in Target | $\Delta\epsilon_{nx}$ = 0.0854$\pi$ mm-mr |
| Injected Proton Energy Spread | $\Delta E$ = 3.5 keV |
| Proton Energy Loss in Target | $\Delta E$ = 210 eV |
| Energy Spread Caused by Target | $\delta E$ = 210 eV |
| Proton Space Charge Energy Spread | $\delta E_{sc}$ = 123 eV |
| Proton Revolution Time | T = 0.6 $\mu$sec |
| Cooling Time for Injected Protons | $t_{cool}$ = 1.2 $\mu$sec |
| Cooling Time for Target Caused, 2$\sigma$ Velocity Growth | $t_{cool}$ = 48 nsec (Single turn cooling) |

Since the longitudinal beam velocity spread is almost always less than or about equal to the transverse velocity spread, the longitudinal velocity typically cools as fast or even faster. Thus, in addition to the beam being cooled transversely by the electron beam, it is also accelerated, as well as cooled longitudinally by the electron beam.

The acceleration mechanism can again be explained via the bowling ball/golf ball analogy. Since the deuterium beam loses some velocity as it passes through the gas target, when it reaches the electron beam it is moving slower than the electron beam. This has the effect of the electrons (golf balls) hitting the projectile ions (bowling ball) from behind, causing an accelerating force. Since the electron beam accelerates as well as cools, no RF acceleration of the ion beam is required to offset the energy lost to the target 20.

In general, instabilities arise because the large number of particles 14 stored have a large collective self space charge field. If a disturbance forms in the particle distribution, the field from the disturbance can affect the environment surrounding the beam, setting up oscillating electromagnetic fields. If those fields then act back on the space charge disturbance such that the disturbance grows, an instability exists which can destroy the beam.

Resonant phenomena are also usually important to evaluate. Resonances occur when some of the particles 14 circulate the system 10 in such a way as to be at the same transverse position at every (or every other) turn around the system 10. Those particles 14 which exhibit this behavior see the same magnet imperfections on every pass, and may be quickly lost from the system 10.

In the electron cooled storage ring presented here, the problems of instability and resonant loss are substantially eliminated. The presence of strong electron cooling forces means that any small offset in particle momentum is typically corrected on each pass. Cooling in a single turn means that the ring 16 described is substantially, from an accelerator physics standpoint, a single pass device, in which instabilities are known to be far less troublesome and in which resonances do not exist. Here, "single turn" means that substantially full cooling to equilibrium is achieved in one pass through the electron beam.

As for particle losses, particle losses are typically due to four factors. That is, particles are lost to production (the desired loss mode, discussed further below), large angle multiple scattering events, large angle single scattering events, and charge exchange.

Regarding large angle multiple scattering, it has been calculated above that the RMS multiple scattering emittance growth is $2\pi$ mm-mr as caused by the beam target interaction. At the 15 sigma point, multiple scattering tends to cause a $30\pi$ mm-mr beam growth. Provided the acceptance of the storage ring 16 (determined by the size of the beam pipes) is $30\pi$ mm-mr, particles outside the 15 sigma scattering angle tend to be lost. This corresponds to $e^{-15}$, or:

$$\text{Losses due to Multiple Scattering} = 3 \times 10^{-7} \quad \text{Eq. (23)}$$

In addition to multiple small angle scattering events, it is possible for the projectile particle to be lost in large angle single scattering events. These single scattering events occur when a projectile particle nearly hits a target particle head on. The impact parameter is related to the scattering angle by:

$$b(\Theta) = [Zze^2/2E] \cot[\Theta/2] \quad \text{Eq. (24)}$$

The quantity of concern is to calculate the cross-section for particles 14 that are lost. It is assumed here that particles 14 are lost if they get an angular kick of 15 mr (leading to an emittance of $30\pi$ mm-mr). Thus, $\Theta = 15$ mr.

For the deuteron beam, Equation (24) has Z=8 for Oxygen and z=1 for deuterium. By making the replacement $2E = m\beta^2c^2$ (in Gaussian units), Equation (24) becomes:

$$\begin{aligned} b(0.015) &= [8e^2/mc^2\beta^2]\cot[0.0075] \quad \text{Eq. (25)} \\ &= 8r_D[\beta^2 \times 0.0075] \\ &= 2.35 \times 10^{-11} \text{ cm,} \end{aligned}$$

and the cross-section corresponding to this impact parameter is:

$$\sigma(0.015) = \pi b^2 = 1.74 \times 10^{-21} \text{ cm}^2 \quad \text{Eq. (26)}$$

For the proton beam where Z=6 for Carbon and z=1 for proton, z=1, Equation (24) can be written as:

$$\begin{aligned} b(0.015) &= [6e^2/mc^2\beta^2]\cot[0.0075] \quad \text{Eq. (27)} \\ &= 6r_p[\beta^2 \times 0.0075] \\ &= 3.29 \times 10^{-11} \text{ cm,} \end{aligned}$$

and the cross-section corresponding to this impact parameter is:

$$\sigma(0.015) = \pi b^2 = 3.40 \times 10^{-21} \text{ cm}^2 \quad \text{Eq. (28)}$$

The probability that a particle will be scattered by 15 mr is given by multiplying the scattering cross-section by the density of scattering centers and the thickness of the target 20.

$$\text{Probability of large angle scattering} = \sigma tn \quad \text{Eq. (29)}$$

For the deuterium example, Equation (29) becomes:

$$= 1.74 \times 10^{-21} \times 2 \times 7 \times 10^{16} = 2.4 \times 10^{-4} \quad \text{Eq. (30)}$$

For the proton example, Equation (29) becomes:

$$= 3.4 \times 10^{-21} \times 0.5 \times 7 \times 10^{16} = 1.2 \times 10^{-4} \quad \text{Eq. (31)}$$

It is also possible for a projectile particle to be lost due to charge exchange. As the beam passes through the gas target it is possible, on relatively rare occasions, for the projectile particle to acquire an electron from the gas target. This process of charge exchange results in a neutral particle which is lost from the storage ring 16. While this process is complicated, a rough empirical estimate of the rate can be obtained. The rough estimate indicates that charge exchange losses may substantially equal large angle scattering losses.

As for the required input current from the ion source, the desired injection current depends on the losses. For the deuteron beam, it is desirable that the source provides approximately 100 micro amps of average current in order to maintain a stored current of approximately 250 mA, in view of losses being substantially equal to $4 \times 10^{-4}$. For the proton beam, it is desirable that the source provides approximately 62.5 micro amps of average current in order to maintain a stored current of approximately 250 mA, in view of losses being substantially equal to $2.5 \times 10^{-4}$.

As for production of the desired product by the system, two quantities of interest regarding the system 10 are the yield and the energy of the yield. For neutron production, the production cross-section for the $O^{16}(d,n)F^{17}$ reaction is about $\sigma=200$ millibarn at 3.2 MeV. The density of oxygen atoms in the target is $N=7.08 \times 10^{16}$ cm$^{-3}$, and the target thickness is 2 cm, so the probability of neutron formation is $$p = \sigma Nt = 2 \times 10^{-25} \times 2 \times 7 \times 10^{16} = 2.8 \times 10^{-8} \quad \text{Eq. (32)}$$

At equilibrium it is expected that the system 10 stores 0.25 A. Therefore the expected neutron production is 7 nA of particle current, or the $$\text{Expected Neutron Yield} = 4.4 \times 10^{10} \text{ Neutrons per second.} \quad \text{Eq. (33)}$$

The output energy of the neutrons can be calculated from simple kinematics. As a simplifying assumption the energy for the forward scattered neutrons is calculated here. The reaction $O^{16}(d,n)F^{17}$ has a Q value of −1.675 MeV. Prior to reacting, the deuteron has an energy of $E_d=3.2$ MeV in the example discussed here, and a momentum of $p_dc=(2 m_dc^2E_d)^{1/2}=109.6$ MeV. After the reaction the total energy of the products is $$E_F + E_n = E_d - Q = 1.525 \text{ MeV,} \quad \text{Eq. (34)}$$

and the total momentum of the products is $$p_Fc + p_nc = p_dc, \text{ or } p_Fc = p_dc - p_nc \qquad \text{Eq. (35)}$$

With the relations $E_F=(p_Fc)^2/2\, m_Fc^2$ and $E_n=(p_nc)^2/2\, m_nc^2$ Eq. (34) becomes:

$$(p_Fc)^2/2\, m_Fc^2 + (p_nc)^2/2\, m_nc^2 = 1.525 \text{ MeV} = (p_dc - p_nc)^2/2\, m_Fc^2 + (p_nc)^2/2\, m_nc^2 \qquad \text{Eq. (36)}$$

Eq. (36) has the form of a quadratic equation in the unknown $p_nc$:

$$[(1/2\, m_Fc^2) + (1/2\, m_nc^2)](p_nc)^2 - 2(p_dcp_nc)/2\, m_Fc^2 + (p_dc)^2/2\, m_Fc^2 - 1.525 \text{ MeV} = 0. \qquad \text{Eq. (37)}$$

The solution to the quadratic equation is $p_nc=51.64$ MeV, or, $$\text{Output Neutron Energy Before Moderation} = 1.42 \text{ MeV}. \qquad \text{Eq. (25)}$$

Table 3 presents the production parameters for high yield neutron production by the system 10.

TABLE 3

Production Parameters of High Yield Neutron Production Storage Ring.

| | |
|---|---|
| Deuteron Beam Current | 250 mA |
| Oxygen Gas Jet Target Thickness | 2 cm |
| Oxygen Gas Jet Target Density | $7.08 \times 10^{16}$ cm$^{-3}$ |
| Oxygen Gas Jet Target Pressure | 1 Torr |
| Fraction of Beam Lost to Multiple Scatters | $3 \times 10^{-7}$ |
| Fraction of Beam Lost to Hard Scatters | $2.4 \times 10^{-4}$ |
| Beam Fraction Lost to Charge Exchange | few $\times 10^{-4}$ |
| Required Deuteron Source Current | 100 $\mu$A |
| Neutron Yield | $4.4 \times 10^{10}$ Neutrons per Second |
| Neutron Production Energy | 1.42 MeV (forward scattered) |

As for gamma ray production, the quantity of interest is the yield. Since the width of the gamma ray production cross section is about 130 eV for the C13(p,γ)N14 reaction, the entire cross section is spanned during the 210 eV energy drop experienced by the protons as they pass through the gas target. The gamma ray production will therefore be the substantially same as if the entire 250 mA proton beam current were dumped into a solid target. Since only a 100 micro ampere proton beam is used to fill the system, the ring may increase gamma ray field by a significant factor over conventional gamma ray production.

Table 4 presents the production parameters for high yield neutron production by the system 10.

TABLE 4

Production Parameters of High Yield Gamma Ray Production Storage Ring.

| | |
|---|---|
| Proton Beam Current | 250 mA |
| Thickness of Gas Jet Target Containing Carbon | 0.5 cm |
| Density of Gas Jet Target Containing Carbon | $7.08 \times 10^{16}$ cm$^{-3}$ |
| Carbon Gas Jet Target Pressure | 1 Torr |
| Fraction of Beam Lost to Multiple Scatters | $2 \times 10^{-9}$ |

TABLE 4-continued

Production Parameters of High Yield Gamma Ray Production Storage Ring.

| | |
|---|---|
| Fraction of Beam Lost to Hard Scatters | $1.2 \times 10^{-4}$ |
| Beam Fraction Lost to Charge Exchange | few $\times 10^{-4}$ |
| Desired Proton Source Current | 62.5 $\mu$A |
| Improvement in Gamma Ray Yield | increased by a factor of approximately 2500 |

From the foregoing, it will be appreciated that the system and method of the present invention promote the production of products, including neutrons, isotopes and photons with improved efficiency and safety. The system advantageously enables the recirculation of projectile particles for repeated encounters with the target, thereby retaining energy used for accelerating the projectile particles within the system, until the particles have either reacted with the target to produce the desired end products, or have irretrievably scattered while circulating the system. By cooling the particles with the electrons provided by the electron cooling system, any significant instabilities that would otherwise cause excessive beam and target heating are reduced, if not substantially eliminated. With the continuous injection of new particles into the ring, the system maintains an equilibrium between particles lost through either reaction or scattering, and particles gained from the particle supply. Accordingly, a particle beam of relatively high intensity may be generated by the system to provide high fluxes of the desired end products, while the system uses a relatively low input current.

While a particular form of the invention has been illustrated and described, it will be apparent that various modifications can be made without departing from the spirit and scope of the invention. Therefore, it is not intended that the invention be limited, except as by the appended claims.

What is claimed is:

1. A nuclear reaction and particle storage system, comprising:
    a projectile particle supply;
    a storage ring that receives projectile particles from said projectile particle supply wherein said projectile particles circulate within said storage ring;
    a target situated within said storage ring; and
    an electron system having an electron source that introduces electrons into said storage ring and an electron collector that captures said electrons.

2. A system in accordance with claim 1, wherein said projectile particle supply substantially continuously supplies projectile particles to said storage ring.

3. A system in accordance with claim 1, wherein said projectile particle supply includes an ion source and an injector accelerator.

4. A system in accordance with claim 1, wherein said storage ring includes:
    a plurality of linear segments connected by a plurality of curved segments; and
    a plurality of dipoles situated proximate to said curved segments to guide said projectile particles through said curved segments.

5. A system in accordance with claim 1, wherein said target is situated in a linear segment of said storage ring.

6. A system in accordance with claim 1, wherein said target is situated in a curved segment of said storage ring.

7. A system in accordance with claim 1, wherein said electron system is situated in a linear segment of said storage ring.

8. A system in accordance with claim 1, further including a merging dipole situated adjacent to an outlet of said projectile particle supply feeding into said storage ring.

9. A system in accordance with claim 1, wherein said target is a gas jet.

10. A system in accordance with claim 1, wherein said target converts charge states of said projectile particles upon entry into said storage ring.

11. A reaction and storage system, comprising:

a negative deuterium supply having a negative deuterium source;

a storage ring that receives said negative deuterium from said negative deuterium supply;

an oxygen jet interacting with said negative deuterium wherein high flux neutrons are generated.

12. A system in accordance with claim 11, wherein said oxygen jet converts said negative deuterium into positive deuterons upon entry of said negative deuterium into said storage ring.

13. A system in accordance with claim 11, further comprising an electron system having an electron source and an electron collector.

14. A system in accordance with claim 11, wherein said oxygen jet is situated at a linear segment of the storage ring.

15. A system in accordance with claim 11, further including a plurality of dipoles situated proximate to curved segments of said storage ring.

16. A system in accordance with claim 11, further including a merging dipole situated adjacent to said deuterium supply.

17. A method for promoting nuclear reaction, comprising:

providing a storage ring having a closed configuration and a target within said storage ring;

introducing projectile particles into said storage ring to impinge the target, and magnetically manipulating a direction of travel of unreacted projectile particles such that said unreacted particles circulate said storage ring; and introducing electrons into said storage ring to join said projectile particles, and removing said electrons.

18. A method in accordance with claim 17, further including the step of situating the target proximate to an entry location of said projectile particles into said storage ring.

19. A method in accordance with claim 17, wherein new projectile particles are introduced into said storage ring to intermingle with said projectile particles circulating the storage ring.

20. A method in accordance with claim 17, wherein said projectile particles are injected into the storage ring at energy levels optimizing probability of reaction with said target for generating desired end-products.

21. A method in accordance with claim 17, further including the step of converting charge of said projectile particles after their entry into the storage ring.

22. A reaction and storage system, comprising:

a supply of negatively-charged hydrogen ions;

a storage ring that receives said ions from said supply;

a jet containing carbon interacting with said ions wherein high flux photons are generated.

23. A system in accordance with claim 22, wherein said jet converts said ions into protons upon entry of said ions into said storage ring.

24. A system in accordance with claim 22, further comprising an electron system having an electron source and an electron collector.

25. A system in accordance with claim 22, wherein said carbon jet is situated at a linear segment of the storage ring.

* * * * *